United States Patent
Cragun et al.

(10) Patent No.: US 6,359,634 B1
(45) Date of Patent: *Mar. 19, 2002

(54) METHOD AND COMPUTER PROGRAM PRODUCT FOR GRAPHICAL USER INTERFACE (GUI) ORGANIZATION CONTROL FOR EXTENDING GUI APPLICATIONS

(75) Inventors: Brian John Cragun; Douglas R. Petty, both of Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,785

(22) Filed: Aug. 25, 1998

(51) Int. Cl.[7] ................................................ G06F 3/00
(52) U.S. Cl. ....................... 345/777; 345/775; 345/776; 345/810
(58) Field of Search ................................ 345/350, 352, 345/340, 333, 326, 777, 776, 775, 739, 769, 789, 781, 810, 811

(56) References Cited

U.S. PATENT DOCUMENTS

| | | | | |
|---|---|---|---|---|
| 5,140,678 A | * | 8/1992 | Torres ......................... | 345/350 |
| 5,392,387 A | * | 2/1995 | Fitzpatrick et al. ......... | 345/350 |
| 5,623,591 A | * | 4/1997 | Cseri .......................... | 345/326 |
| 5,668,964 A | * | 9/1997 | Helsel et al. ............... | 345/350 |
| 5,745,718 A | * | 4/1998 | Cline et al. ................. | 345/350 |
| 5,808,610 A | * | 9/1998 | Benson et al. .............. | 345/342 |
| 5,852,441 A | * | 12/1998 | Nakajima et al. ........... | 345/352 |
| 5,877,746 A | * | 3/1999 | Parks et al. ................. | 345/156 |
| 5,909,684 A | * | 6/1999 | Nelson ........................ | 707/103 |
| 5,929,851 A | * | 7/1999 | Donnelly ..................... | 345/333 |
| 6,002,398 A | * | 12/1999 | Wilson ........................ | 345/346 |
| 6,166,736 A | * | 12/2000 | Hugh .......................... | 345/340 |

OTHER PUBLICATIONS

Edson (Chicago Interface Gadgets, Part III: Programming Properly with Property Sheets, Microsoft System Journal, Oct. 1994, pp. 33–63).*

Prosise (Programming Windows'95 with MFC, Part VI: Dialog Boxes, Property Sheets, and Controls, Microsoft System Journal, Dec. 1995, pp. 53–72).*

MicroSoft Press (The Windows Interface Guidelines for Software Design, 1995, pp. 187–193).*

"Programming The Windows 95 User Interface", By Nancy Winnick Cluts, 1995, pp. 326–327.

* cited by examiner

Primary Examiner—Raymond J. Bayerl
Assistant Examiner—Sy D. Luu
(74) Attorney, Agent, or Firm—Joan Pennington

(57) ABSTRACT

A method and computer program product are provided for graphical user interface (GUI) organization control for extending GUI applications. An initial tabbed dialog is processed. Each page to be added to the initial tabbed dialog is identified. A location is identified for each identified added page to the initial tabbed dialog. A modified tabbed dialog including each added page at the respective identified location is displayed. A user selected position setting can be used to identify a location for each identified added page to the initial tabbed dialog. This position setting can be based upon a priority or a usage value. Also, a drag and drop routine can be used to identify a location for each identified added page to the initial tabbed dialog.

12 Claims, 17 Drawing Sheets

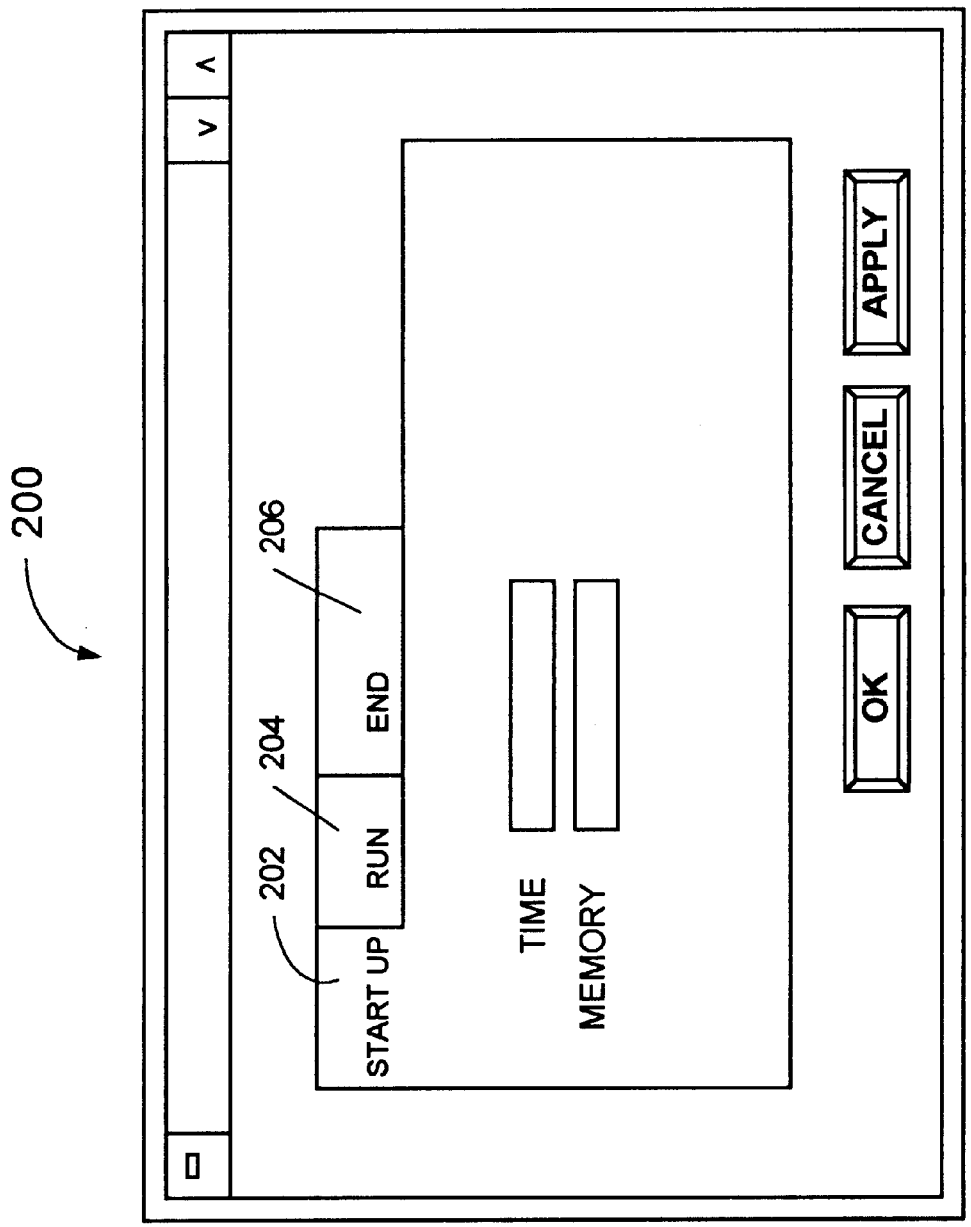

FIG. 3A

PAGE POCKET RECORD 118

| PAGE/POCKET ID 302 |
|---|
| TYPE 304 |

FIG. 3D

PAGE TABLE 124

| DIALOG ID 308 | POCKET ID 310 | PAGE HANDLER 312 | PAGE ID 314 | PRE-REQUISITES | PRIORITY 316 | USAGE 318 | BUDDY PAGE HANDLER 320 | BUDDY PAGE ID 322 | LOADED 324 |
|---|---|---|---|---|---|---|---|---|---|
| JOB | POST-START | SECURITY | PRE-REQUISITES | 10 | 4 | | | | |
| JOB | POST-START | SECURITY | START-UP | 8 | 6 | SECURITY | OVERRIDES | T | |
| JOB | | JOB | OVERRIDES | 6 | 1 | | | T | |
| JOB | | JOB | RUN | 7 | 3 | | | T | |
| JOB | | JOB | END | 5 | 4 | | | T | |
| JOB | | PREF | PREF | 0 | 3 | | | T | |

FIG. 3C

PAGE POCKET LIST 122

| PAGE/POCKET ID 302 | TYPE 304 |
|---|---|
| PRE-START 332 | POCKET 346 |
| START 334 | PAGE 348 |
| POST-START 336 | POCKET 346 |
| RUN 338 | PAGE 348 |
| POST-RUN 340 | POCKET 346 |
| END 342 | PAGE 348 |
| POST-END 344 | POCKET 346 |

FIG. 3B

PAGE INFO RECORD 120

| DIALOG ID 308 |
|---|
| POCKET ID 310 |
| PAGE HANDLER 312 |
| PAGE ID 314 |
| PRIORITY 316 |
| USAGE 318 |
| BUDDY PAGE HANDLER 320 |
| BUDDY PAGE ID 322 |
| LOADED 324 |

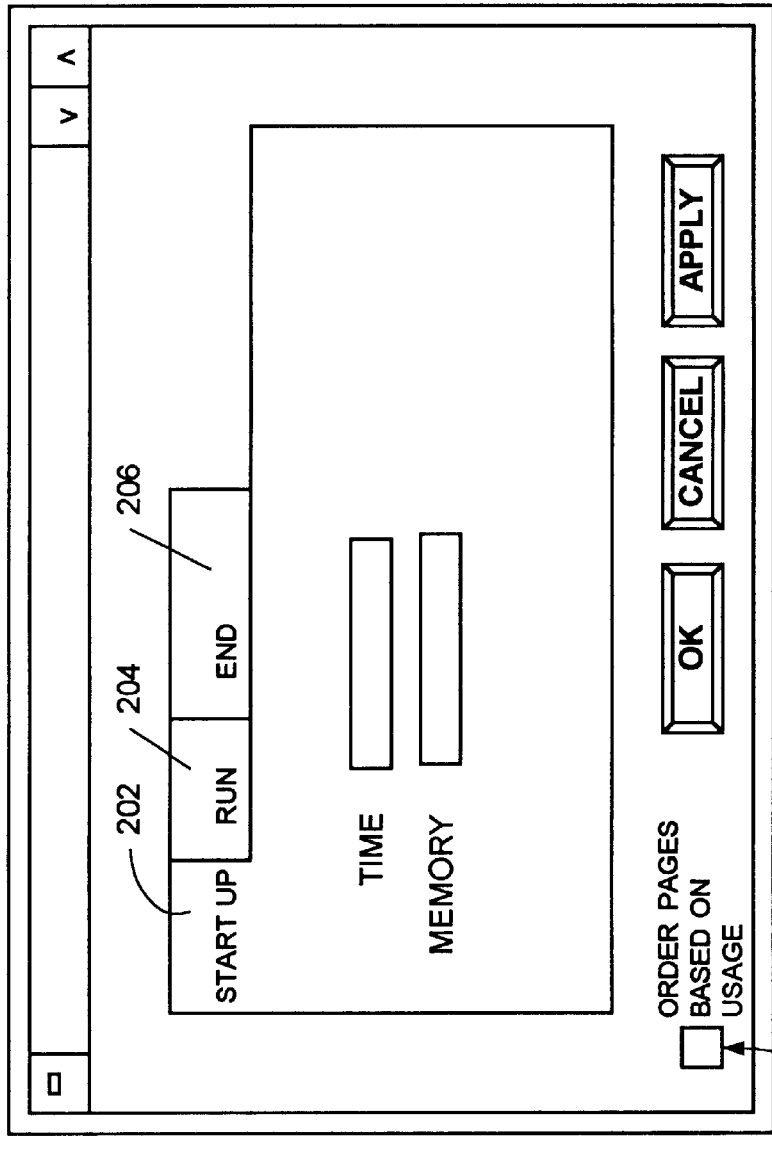

METHOD AND COMPUTER PROGRAM PRODUCT FOR GRAPHICAL USER INTERFACE (GUI) ORGANIZATION CONTROL FOR EXTENDING GUI APPLICATIONS

FIELD OF THE INVENTION

The present invention relates to the data processing field, and more particularly, relates to a method and computer program product for graphical user interface (GUI) organization control for extending GUI applications.

DESCRIPTION OF THE RELATED ART

A common windows interface is the tabbed dialog, such as those used with property pages in Windows 95 and Windows NT. The tabbed dialog is a container for multiple property pages. The tabbed dialog is displayed for a user to supply information or specify options or properties. Tabs are used by the tabbed dialog to select property pages. Windows has mechanisms using a Component Object Model (COM) specification which allow a "third party" to create a property page that attaches to the tabbed dialog of an application, if the application enables the property page. Current art allows these extension tabs to be added at the end of the tabs, after the standard tabs have been added.

A particular application may contain a tabbed dialog for multiple, specialized property pages, each with tabs in a particular order. A need exists to allow future expansion, or third parties to add to the pages within the tabbed dialog, without knowing in advance where pages should be added. A problem is that each call to add a regular application page is hard coded. A need exists to allow future expansion of third party added pages within a tabbed dialog while keeping the hard coded application tabs.

SUMMARY OF THE INVENTION

A principal object of the present invention is to provide a method and computer program product for graphical user interface (GUI) organization control for extending GUI applications. Other important objects of the present invention are to provide such method and computer program product for graphical user interface (GUI) organization control for extending GUI applications substantially without negative effect; and that overcome some disadvantages of prior art arrangements.

In brief, a method and computer program product are provided for graphical user interface (GUI) organization control for extending GUI applications. An initial tabbed dialog is processed. Each page to be added to the initial tabbed dialog is identified. A location is identified for each identified added page to the initial tabbed dialog. A modified tabbed dialog including each added page at the respective identified location is displayed.

In accordance with features of the invention, a user selected position setting can be used to identify a location for each identified added page to the initial tabbed dialog. This position setting can be based upon a priority or a usage value. Also, a drag and drop routine can be used to identify a location for each identified added page to the initial tabbed dialog.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A and 2B respectively provide an exemplary display screen of the system of FIG. 1 illustrating an initial GUI interface tabbed dialog box and a modified GUI interface tabbed dialog box having added pages between initial standard pages of FIG. 2A in accordance with the preferred embodiments;

FIG. 3A is a chart illustrating an exemplary internal data structure of a page pocket record for providing graphical user interface (GUI) organization control for extending GUI applications of the preferred embodiments;

FIG. 3B is a chart illustrating an exemplary internal data structure of a page information record for providing graphical user interface (GUI) organization control for extending GUI applications of the preferred embodiments;

FIG. 3C is a chart illustrating an exemplary internal data structure of a page pocket list for providing graphical user interface (GUI) organization control for extending GUI applications of the preferred embodiments;

FIG. 3D is a chart illustrating an exemplary internal data structure of a page table for providing graphical user interface (GUI) organization control for extending GUI applications of the preferred embodiments;

FIG. 4B is an exemplary display screen of the system of FIG. 1 illustrating an alternate embodiment of preferences dialog for ordering pages accessible from a GUI interface tabbed dialog border in accordance with the preferred embodiments;

DETAILED DESCRIPTION OF THE PREFERRED EMBODIMENTS

Figure 1:
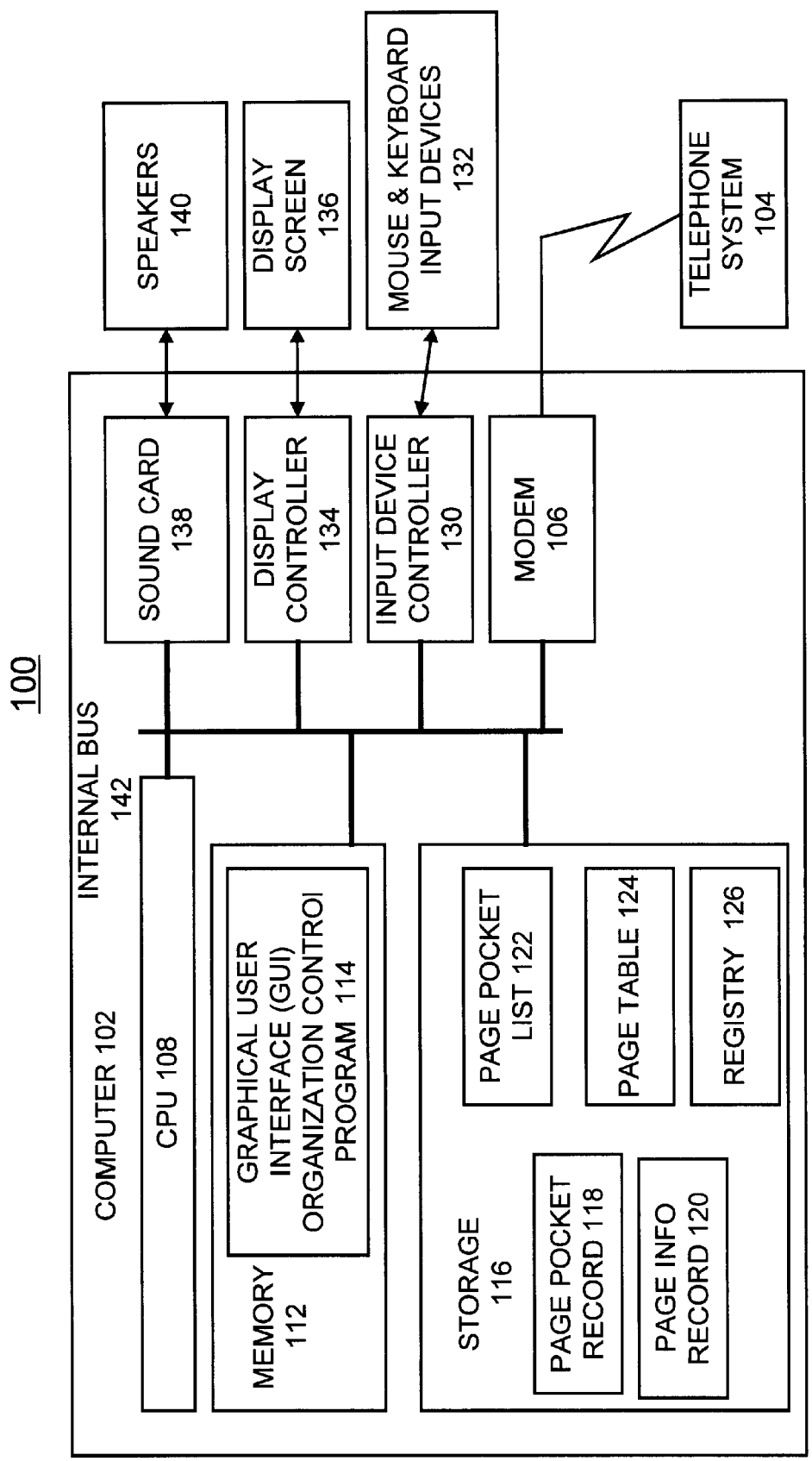
FIG. 1 is a block diagram representation illustrating a computer system for implementing methods and computer program product for graphical user interface (GUI) organization control extending GUI applications in accordance with the preferred embodiments.

Having reference now to the drawings, in FIG. 1 there is shown is a block diagram representation illustrating a computer system generally designated by 100 for performing methods and utilizing a computer program product for providing graphical user interface (GUI) organization control for extending GUI applications in accordance with the preferred embodiment. Computer system 100 includes a computer 102 optionally connected to a telephone system 104 via an internal modem 106, as shown. It should be understood that computer system 100 optionally can be connected to a local area network (LAN), not shown. Computer 102 includes a central processing unit (CPU) 108 and a first memory and a second storage respectively designated by 112 and 116. As illustrated, memory 112 stores program and data information including a graphical user interface (GUI) organization control program 114 for providing graphical user interface (GUI) organization control for extending GUI applications of the preferred embodiments. Storage 116 stores a page pocket record 118, a page information record 120, a page pocket list 122, a page table 124, and a registry 126 of the preferred embodiment. The page pocket record 118, the page information record 120, the page pocket list 122, and the page table 124 are respectively illustrated and described with respect to FIGS. 3A, 3B, 3C, and 3D. The registry 126 is a central systemwide persistent state registry, such as a Windows registry, or alternatively a separate file for storing persistent page state information. Computer 102 includes an input device controller 130 operatively coupled to a mouse and keyboard input devices 132, a display controller 134 operatively coupled to a display screen 136 and a sound card 138 operatively coupled to speakers 140. An internal bus 142 facilitates communications among the components of computer 102.

Various commercially available computers can be used for computer 102 in the computer system 100, for example, an IBM personal computer. CPU 108 is suitably programmed by the graphical user interface (GUI) organization control program 114 to generate display screens, for example as shown in FIGS. 2A, 2B, 4A, and 4B; to maintain the internal data structures or the page pocket record 118, the page information record 120, the page pocket list 122, and the page table 124 as illustrated in FIGS. 3A, 3B, 3C, and 3D and to execute the flowcharts of FIGS. 5A, 5B, 6A, 6B, 6C, 7A, 7B, 7C, and 7D.

In accordance with features of the invention, future expansion of third party added pages is enabled within a tabbed dialog while keeping the hard coded application tabs. Identifiers of added third party pages are added to the registry 126 along with information about which tabbed dialog or property sheet each added page is to be attached and which pocket of space between existing property page tabs where each added page is to be located. Each page within a tabbed dialog is processed, adding hard coded tabs, and checking for third party pages at each defined open position or page pocket.

Figure 2B:
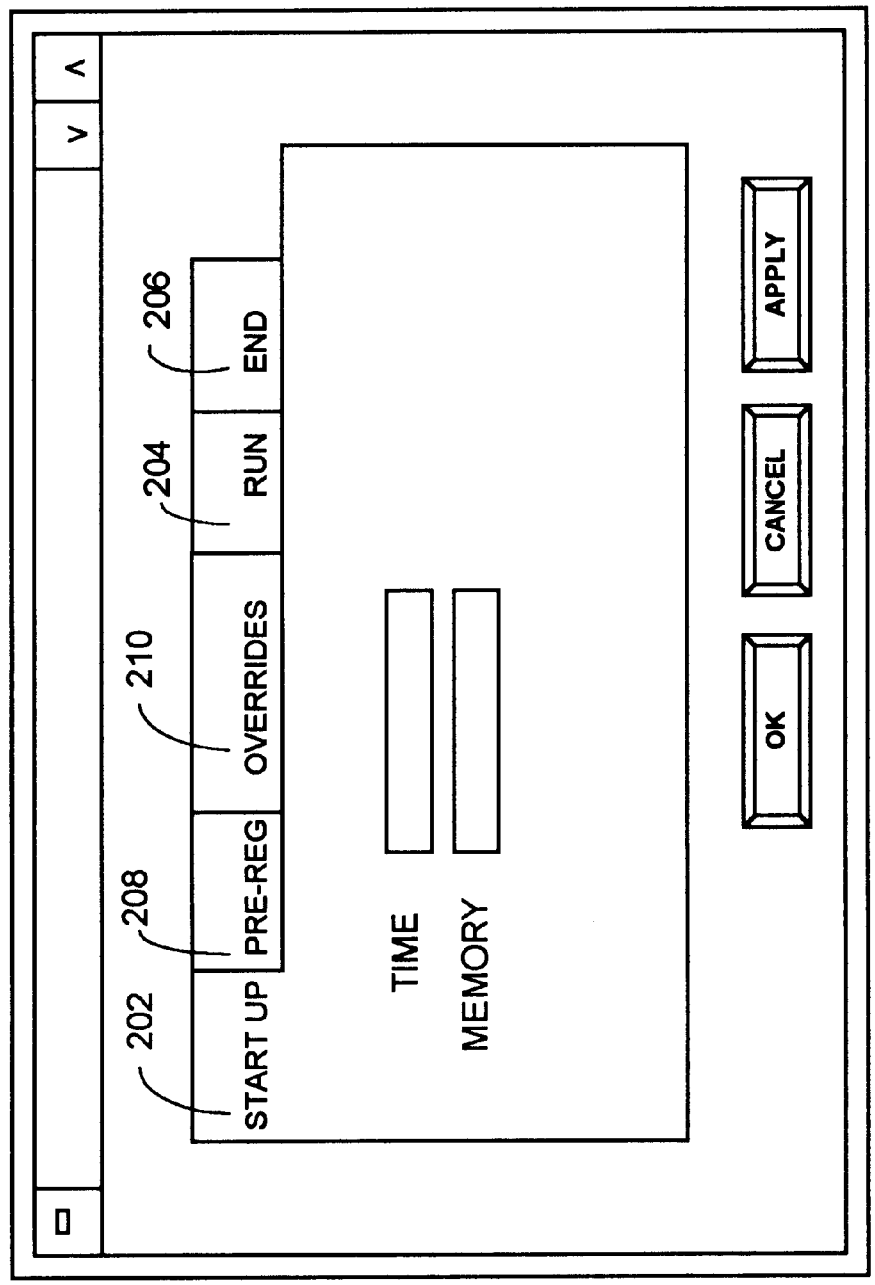

In each of the FIGS. 2A and 2B, an exemplary display screen 200 and 200A of the system 100 is provided. The display screen 200 of FIG. 2A illustrates an initial GUI interface tabbed dialog box including a plurality of property pages 202, 204 and 206. The display screen 200A of FIG. 2B illustrates a modified GUI interface tabbed dialog box having added pages 208 and 210 between the exemplary initial standard pages 202, 204 and 206 of FIG. 2A in accordance with features of the embodiments of the present invention.

FIG. 3A illustrates an exemplary internal data structure of the page pocket record 118 used to provide graphical user interface (GUI) organization control for extending GUI applications of the preferred embodiments. Each page pocket record 118 includes a unique page/pocket ID 302 and a type 304.

FIG. 3B illustrates an exemplary internal data structure of the page information record 120 used by the graphical user interface (GUI) organization control methods for extending GUI applications of the preferred embodiments. The page info record 120 includes a dialog ID 308, a pocket ID 310, a page handler 312, a page ID 314, a priority 316, a usage 318, a buddy page handler 320, a buddy page ID 322, and a loaded indicator 324. Selected ones of these fields of the page info record 120 are used by graphical user interface (GUI) organization control methods of the preferred embodiments.

FIG. 3C illustrates an exemplary internal data structure of the page pocket list 122 used by the graphical user interface (GUI) organization control methods for extending GUI applications of the preferred embodiments. The page pocket list 122 includes multiple page pocket records 118, each including the page/pocket ID 302 and the type 304. In FIG. 3C, the illustrated page pocket list 122 includes multiple page/pocket IDs 302 including pre-start 332, start 334, post-start 336, run 338, post-run 340, end 342, and post-end 344. Each of the multiple page/pocket IDs 302 is provided together with a type 304 including one of a pocket 346 and a page 348.

FIG. 3D illustrates an exemplary internal data structure of a page table 124 used by the graphical user interface (GUI) organization control methods for extending GUI applications of the preferred embodiments. Exemplary page table 124 includes multiple table entries of the dialog ID 308, pocket ID 310, page handler 312, a page ID 314, priority 316, usage 318, buddy page handler 320, buddy page ID 322, and loaded indicator 324.

Figure 4A:
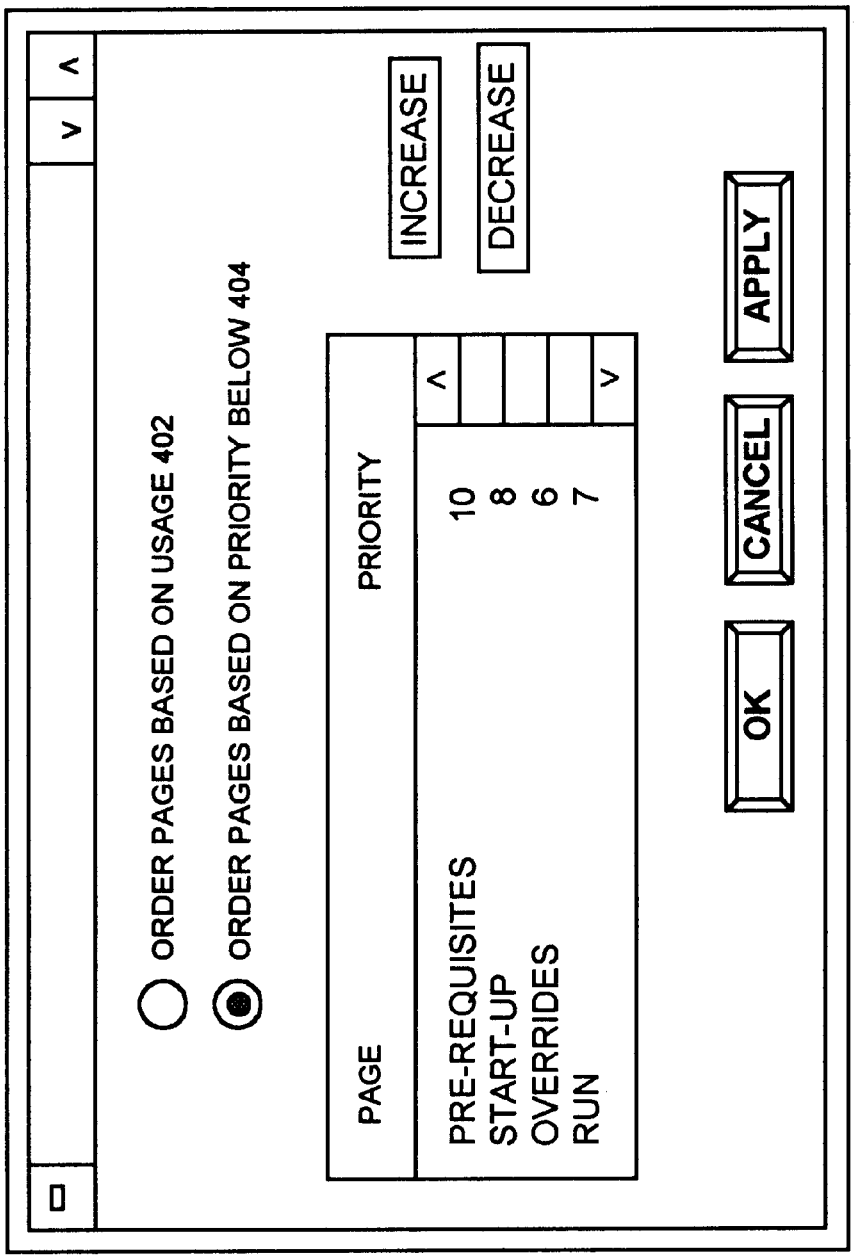
FIG. 4A is an exemplary display screen of the system of FIG. 1 illustrating a preferences dialog for ordering pages in a modified GUI interface tabbed dialog box in accordance with the preferred embodiments.

FIG. 4A is an exemplary display screen of the system 100 illustrating a preferences dialog 400 for ordering pages in a modified GUI interface tabbed dialog box. In the preferences dialog 400, a user is enabled to make a selection to ORDER PAGES BASED ON USAGE 402 or to ORDER PAGES BASED ON PRIORITY 404. The page priority 316 for a particular page ID 314 can be changed by the user with INCREASE and DECREASE selections.

FIG. 4B is an exemplary display screen of the system 100 illustrating an alternate embodiment of preferences dialog 200B for ordering pages accessible from a GUI interface tabbed dialog border. In the alternate preferences dialog 200B, a user is enabled to make a selection to ORDER PAGES BASED ON USAGE 406 from the GUI interface tabbed dialog border, as shown.

Figure 5A:
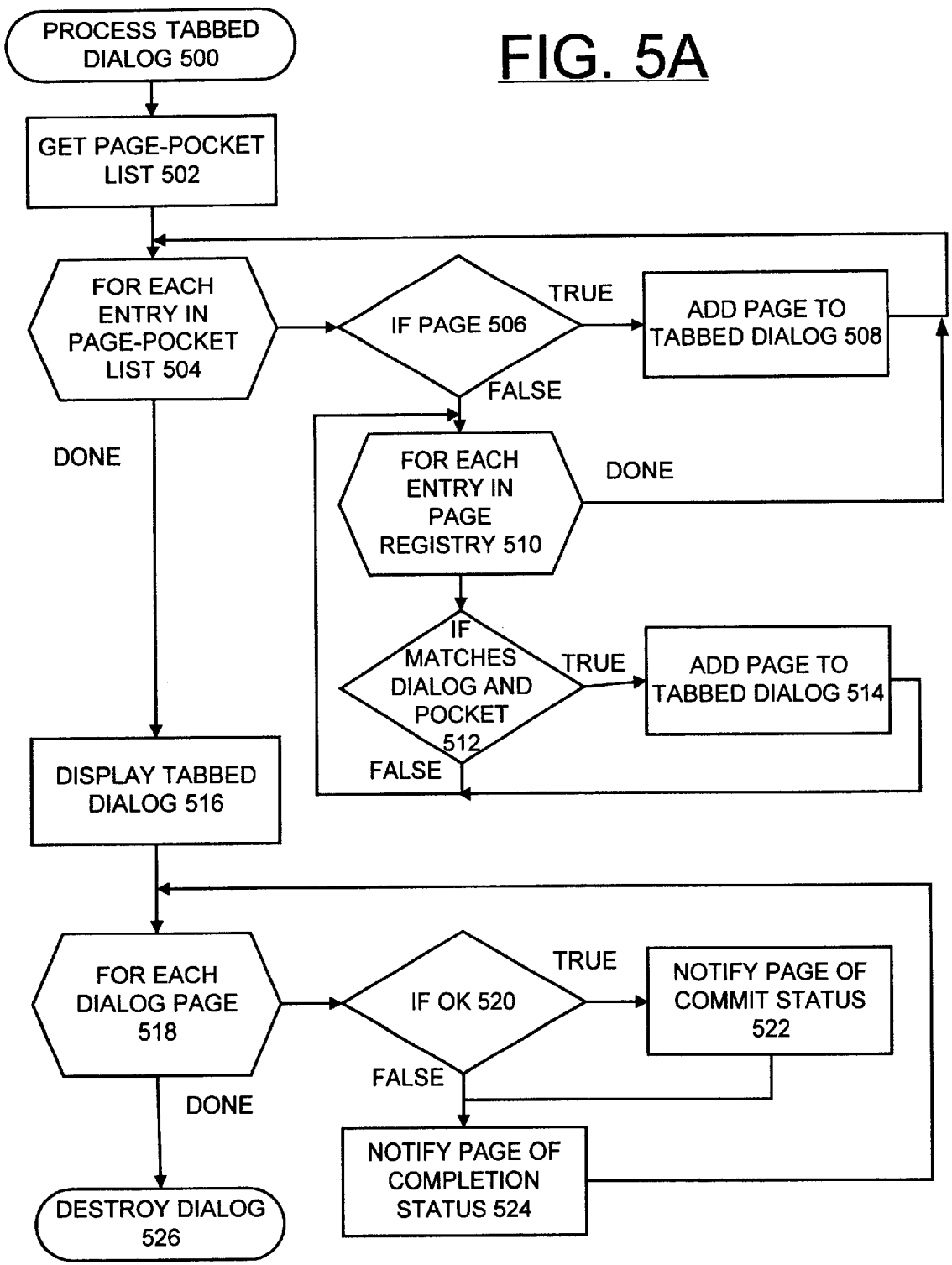
FIGS. 5A and 5B together provide a flow chart illustrating sequential operations in accordance with the method and computer program product for providing graphical user interface (GUI) organization control for extending GUI applications of the preferred embodiments.
Figure 5B:
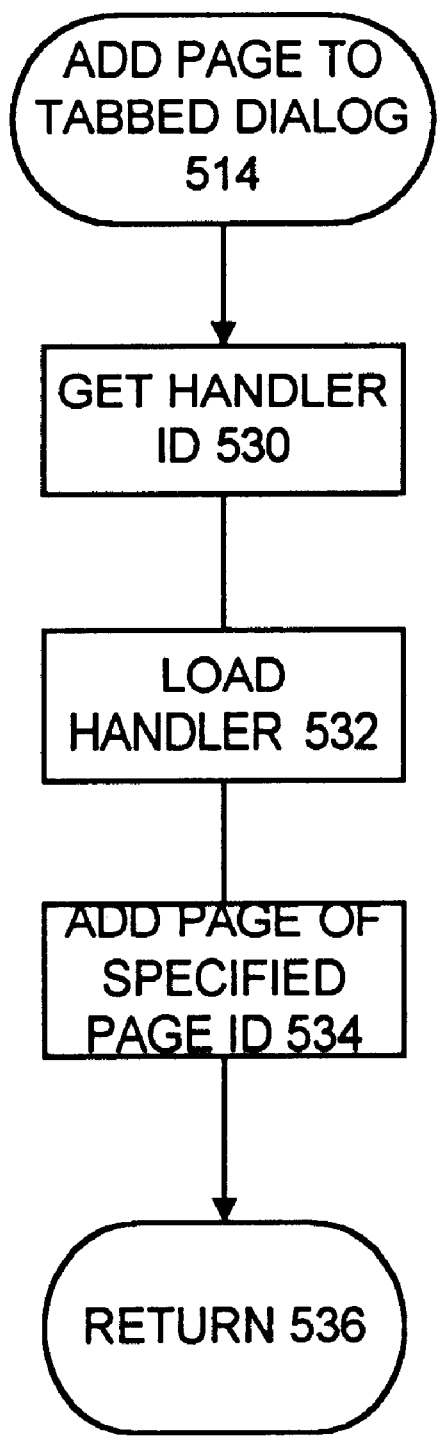

FIGS. 5A and 5B together provide a flow chart illustrating sequential operations in accordance with the graphical user interface (GUI) organization control method for extending GUI applications of the preferred embodiment. In FIG. 5A, a tabbed dialog is processed as indicated at block 500. A page pocket list is obtained as indicated at block 502. For each entry in the page pocket list as indicated at block 504, checking for pages is performed as indicated at decision block 508. If true, the page is added to the tabbed dialog as indicated at block 508. Otherwise if false, for each entry in the page registry as indicated at block 510, checking for matches of the dialog and pocket is performed as indicated at decision block 512. The matching page registry entries for added tabbed dialog have been added to the page registry 126 directly or alternatively using a RegEdit4 file for adding information to the registry 126. If the page matches the dialog and pocket, the page is added to the tabbed dialog as indicated at block 514. After checking each entry in the page registry, the operations return to process a next entry in the page pocket list. After each entry in the page pocket list is processed, the modified tabbed dialog is displayed as indicated at block 516. Upon completion of user interaction, processing continues at block 518. Post processing for each dialog page is performed as indicated at blocks 518 and 520. If the user ended the dialog in block 516 by selecting OK, then the page is notified of a commit status as indicated at block 522. The commit status notice indicated to the page that changes to the page can be processed and committed. After the page is notified of the commit status and if the user selected cancel to end the dialog, the page is notified of a completion status as indicated at block 524. After checking each dialog page, the dialog is destroyed as indicated at block 526.

In FIG. 5B, sequential steps for adding a page to the tabbed dialog at block 514 of FIG. 5A are shown. A page handler ID is obtained as indicated at block 530. The handler ID is loaded as indicated at block 532. The page of a specified page ID is added as indicated at block 534. Then the sequential operations return as indicated at block 536.

Figure 6A:
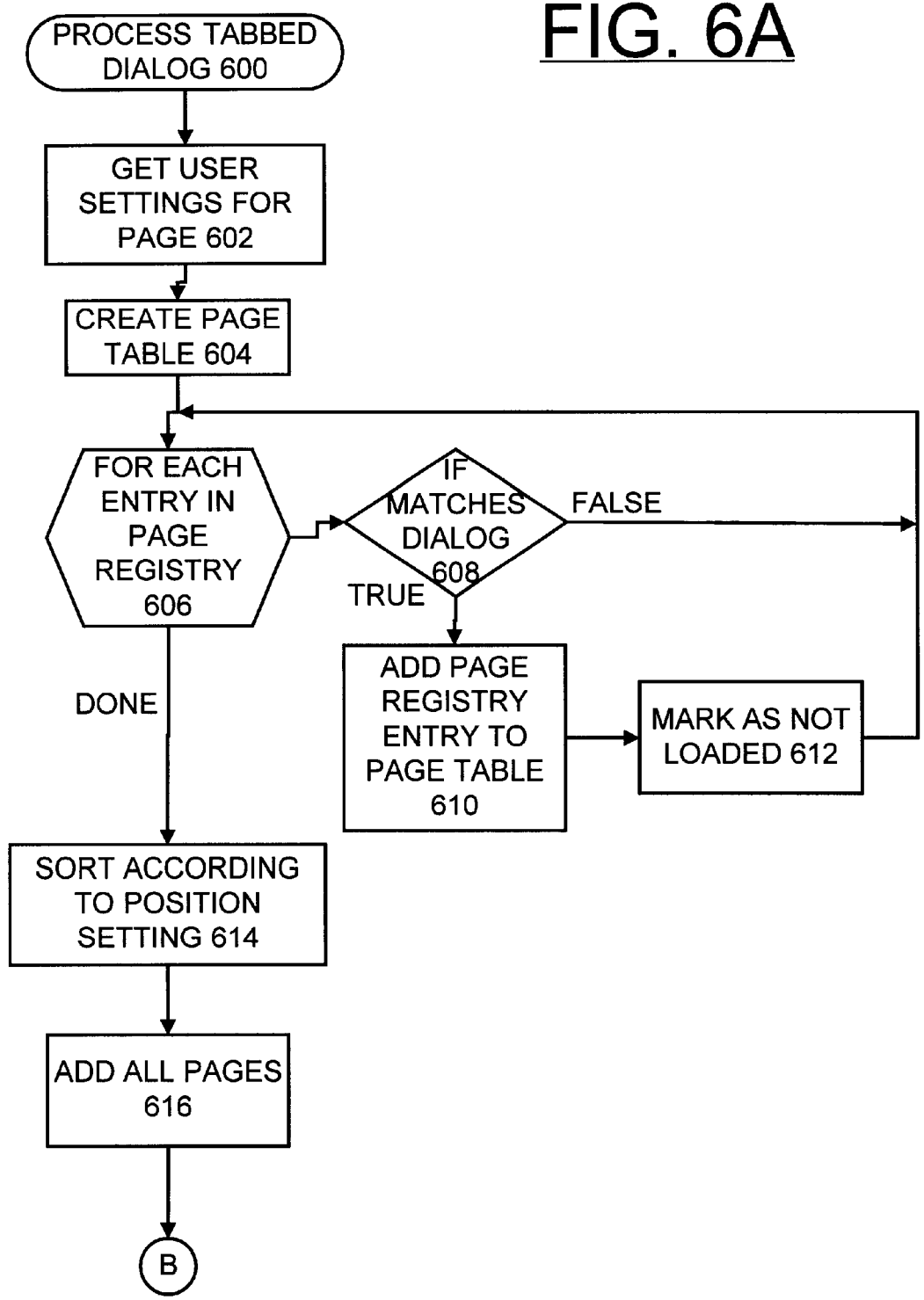
FIGS. 6A, 6B, and 6C together provide a flow chart illustrating sequential operations in accordance with a first alternative method and computer program product for providing graphical user interface (GUI) organization control for extending GUI applications of the preferred embodiments.
Figure 6B:
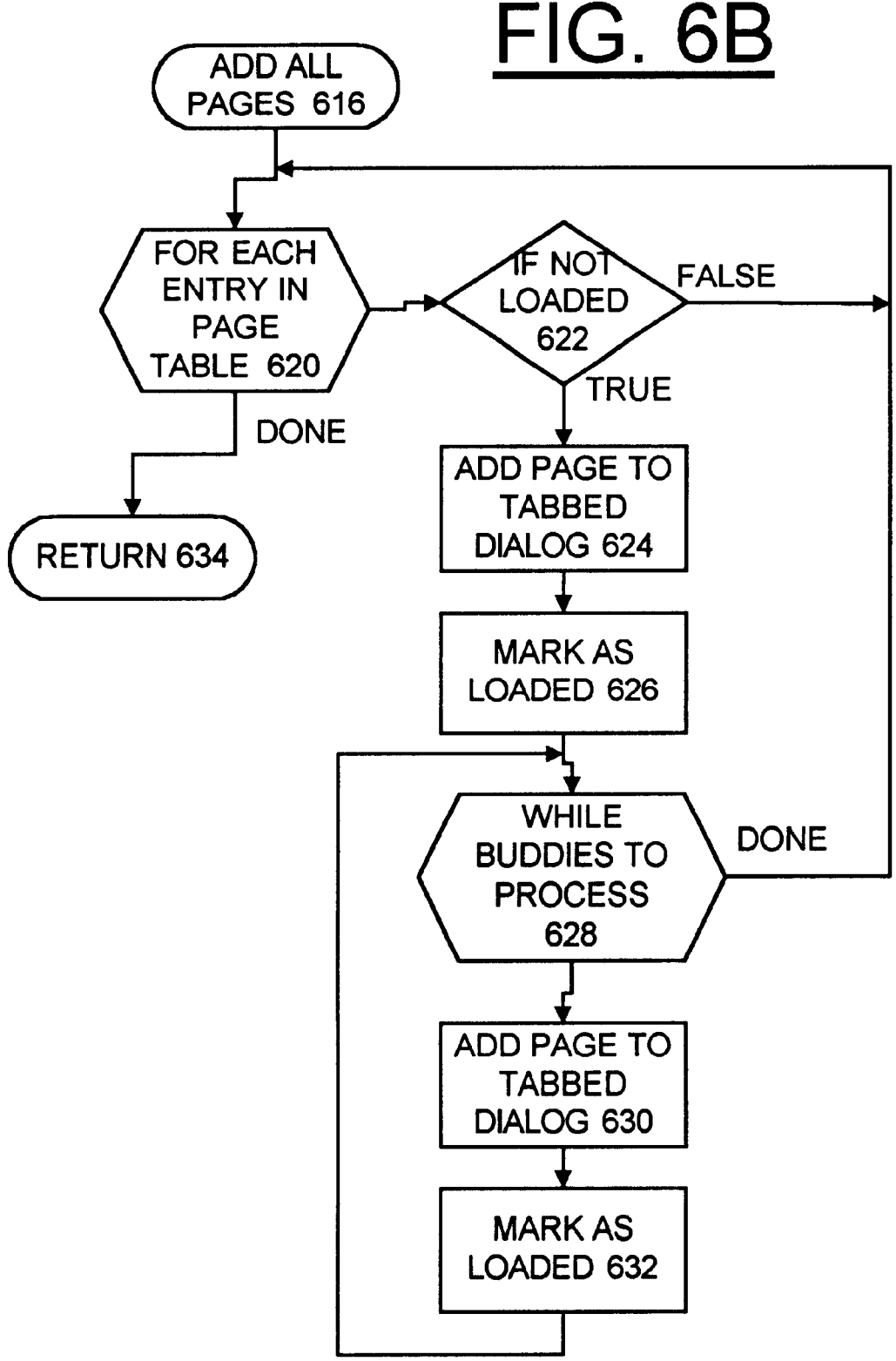
Figure 6C:
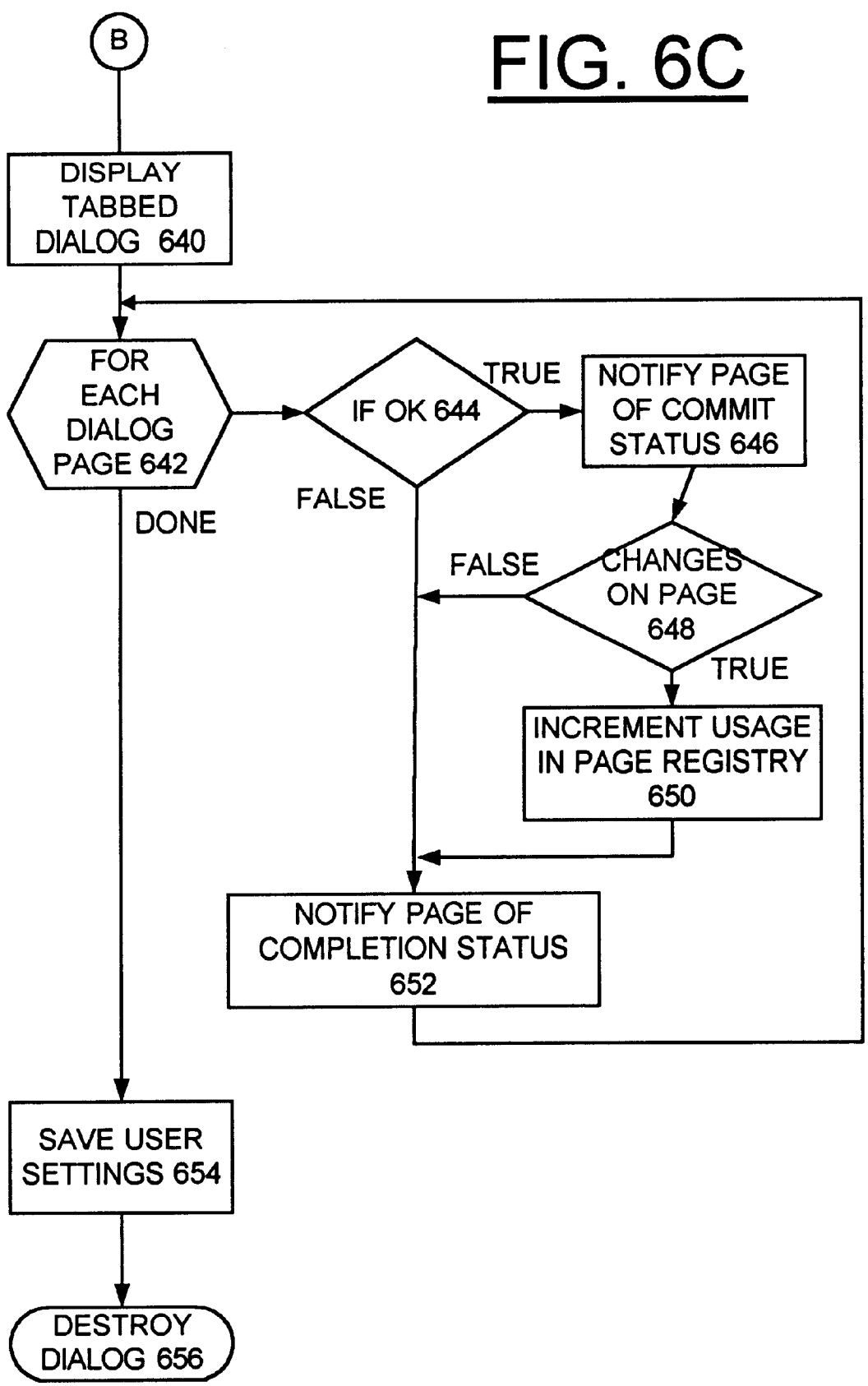

FIG. 6A, 6B, and 6C together provide a flow chart illustrating sequential operations in accordance with a first alternative method for providing graphical user interface (GUI) organization control for extending GUI applications of the preferred embodiment. In FIG. 6A, a tabbed dialog is processed as indicated at block 600. User settings for a page are obtained as indicated at block 602. A page table is created as indicated at block 604. For each entry in the page registry as indicated at block 606, checking for a matching dialog is performed as indicated at decision block 608. For each page registry entry having a matching dialog, the page registry entry is added to the page table as indicated at block 610. The added page registry entry to the page table is marked as not loaded as indicated at block 612. When done, the page table is sorted according to position setting and all pages are added as indicated at blocks 614 and 616.

In FIG. 6B, the sequential steps to add all pages at block 616 of FIG. 6A are shown. For each entry in page table as indicated at block 620, checking whether the page is marked as not loaded is performed as indicated at decision block 622. If not loaded, the page of the page table entry is added to the tabbed dialog and marked as loaded as indicated at blocks 624 and 626. Then while there are buddies to process as indicated at block 628, the buddy pages are added to the tabbed dialog and marked as loaded as indicated at blocks 630 and 632. Then the sequential operations return as indicated at block 632.

In FIG. 6C, the sequential operations following entry point B continue with displaying the tabbed dialog as indicated at block 640. Upon completion of user interaction, processing continues for each dialog page as indicated at blocks 642 and 644. If the user ended the dialog by selecting OK, then the page is notified of the commit status as indicated at block 646. Then checking for changes on the page is performed as indicated at decision block 648. If there are changes on the page, then the usage in the page registry is incremented as indicated at block 650. The page is notified of the completion status as indicated at block 652. After saving the user settings as indicated at block 654, the dialog is destroyed as indicated at block 656.

Figure 7A:
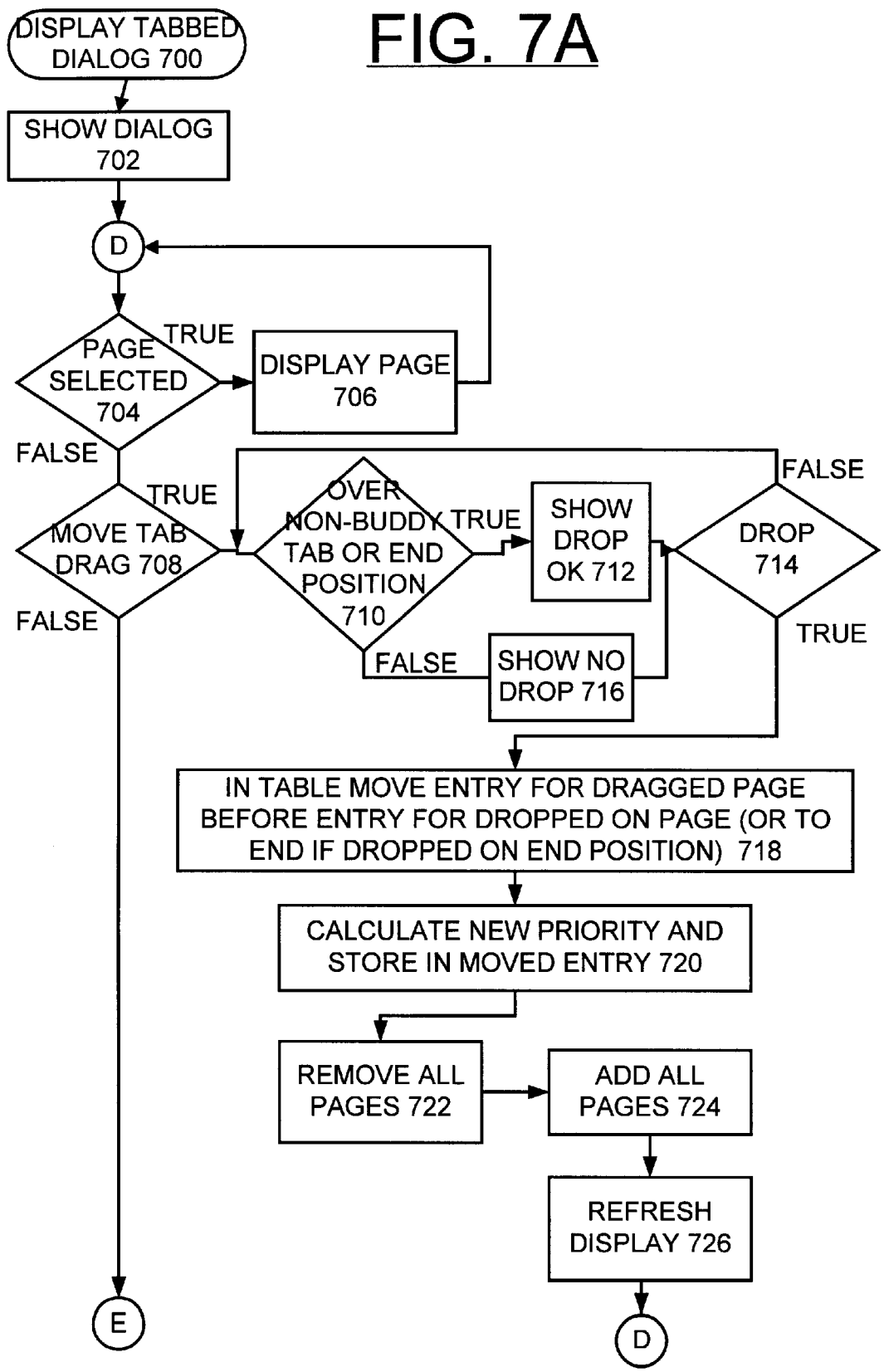
FIGS. 7A, 7B, 7C, and 7D together provide a flow chart illustrating sequential operations in accordance with a second alternative method and computer program product for providing graphical user interface (GUI) organization control for extending GUI applications of the preferred embodiments.

FIGS. 7A, 7B, 7C, and 7D together provide a flow chart illustrating sequential operations in accordance with another alternative method for providing graphical user interface (GUI) organization control for extending GUI applications of the preferred embodiment. In FIG. 7A, first a tabbed dialog is displayed as indicated at block 700. A dialog is shown as indicated at block 702. Checking for a selected page is performed as indicated at decision block 704. When a selected page is identified, the page is displayed as indicated at block 706. When a selected page is not identified, checking for a tab drag is performed as indicated at decision block 708. When a tab drag is identified, checking for a tab drag over a non-buddy tab or end position is performed as indicated at decision block 710. For an identified tab drag over a non-buddy tab or end position, drop OK is shown as indicated at block 712. Otherwise when the tab drag over a non-buddy tab or end position is false, no drop is shown as indicated at block 714. Checking for a drop is performed as indicated at decision block 716. If a drop is identified, the entry for dragged page is moved in the page table before entry for the dropped page or to the end if dropped on the end position as indicated at block 718. A new priority is calculated and stored in the moved entry as indicated at block 720. Next all pages are removed and then all pages are added to the tabbed dialog as indicated at blocks 722 and 724. The display is refreshed as indicated at block 726. Then the sequential operations return to entry point D in FIG. 7A for checking for a selected page at decision block 704.

Figure 7B:
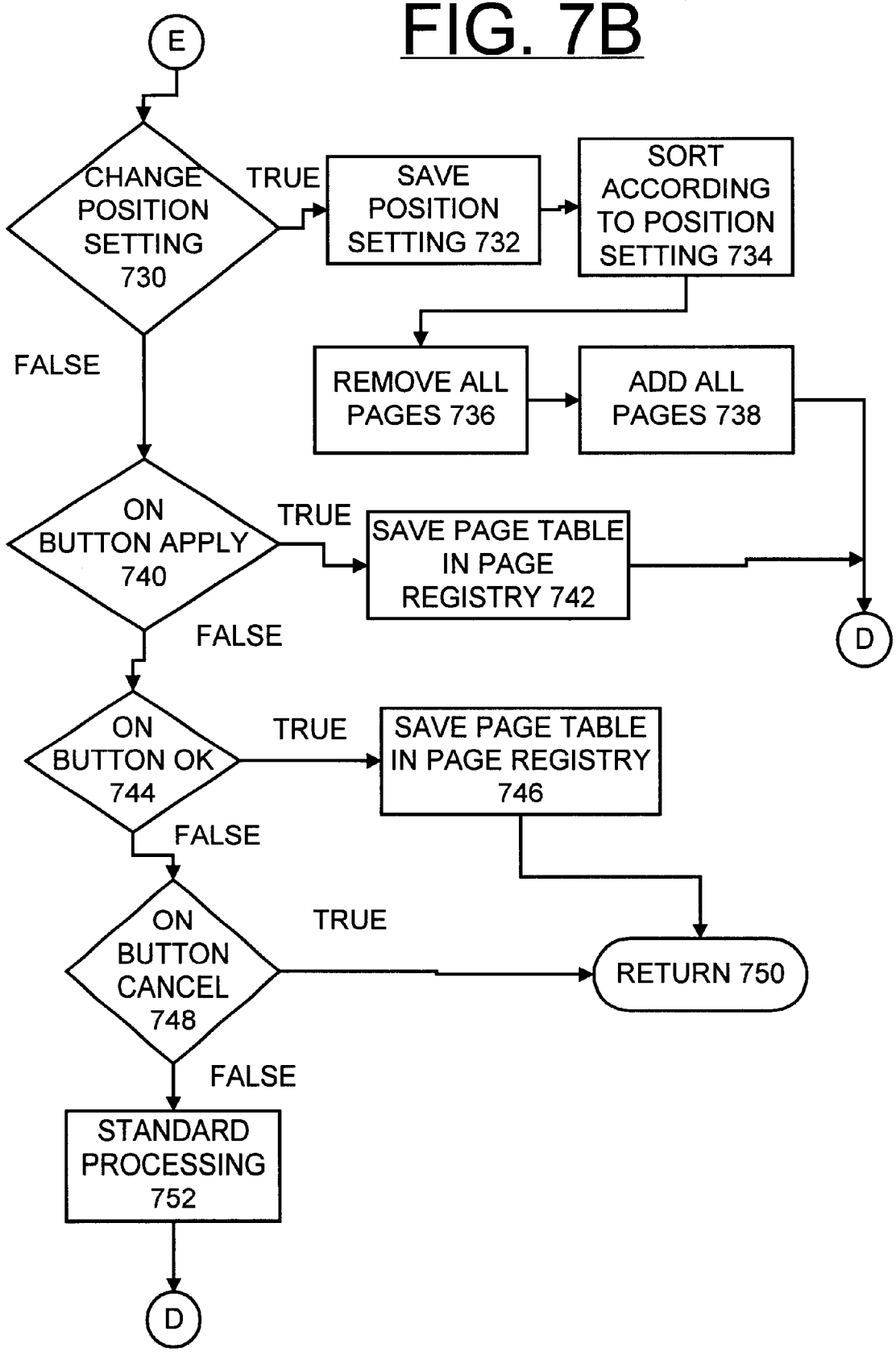

In FIG. 7B, when a move tab drag is not identified at decision block 708 the sequential operations following entry point E continue with checking for a position setting change as indicated at decision block 730. With an identified position setting change such as indicated by the user selection 406 of FIG. 4B, the position setting is saved as indicated at block 732. The page table is sorted according to position setting and all pages are removed and then added as indicated at blocks 734, 736 and 738. Then the sequential operations return to entry point D in FIG. 7A for checking for a selected page at decision block 704. Otherwise when a position setting change is not identified at block 730, then checking for an on button apply is performed as indicated at decision block 740. When an on button apply is identified, then the page table is saved in the page registry as indicated at block 742. Then the sequential operations return to entry point D in FIG. 7A. When an on button apply is not identified, then checking for an on button cancel is performed as indicated at decision block 748. When an on button cancel is identified, then the operations return as indicated at block 750. Otherwise standard processing is performed as indicated at block 752 and the sequential operations return to entry point D in FIG. 7A.

Figure 7C:
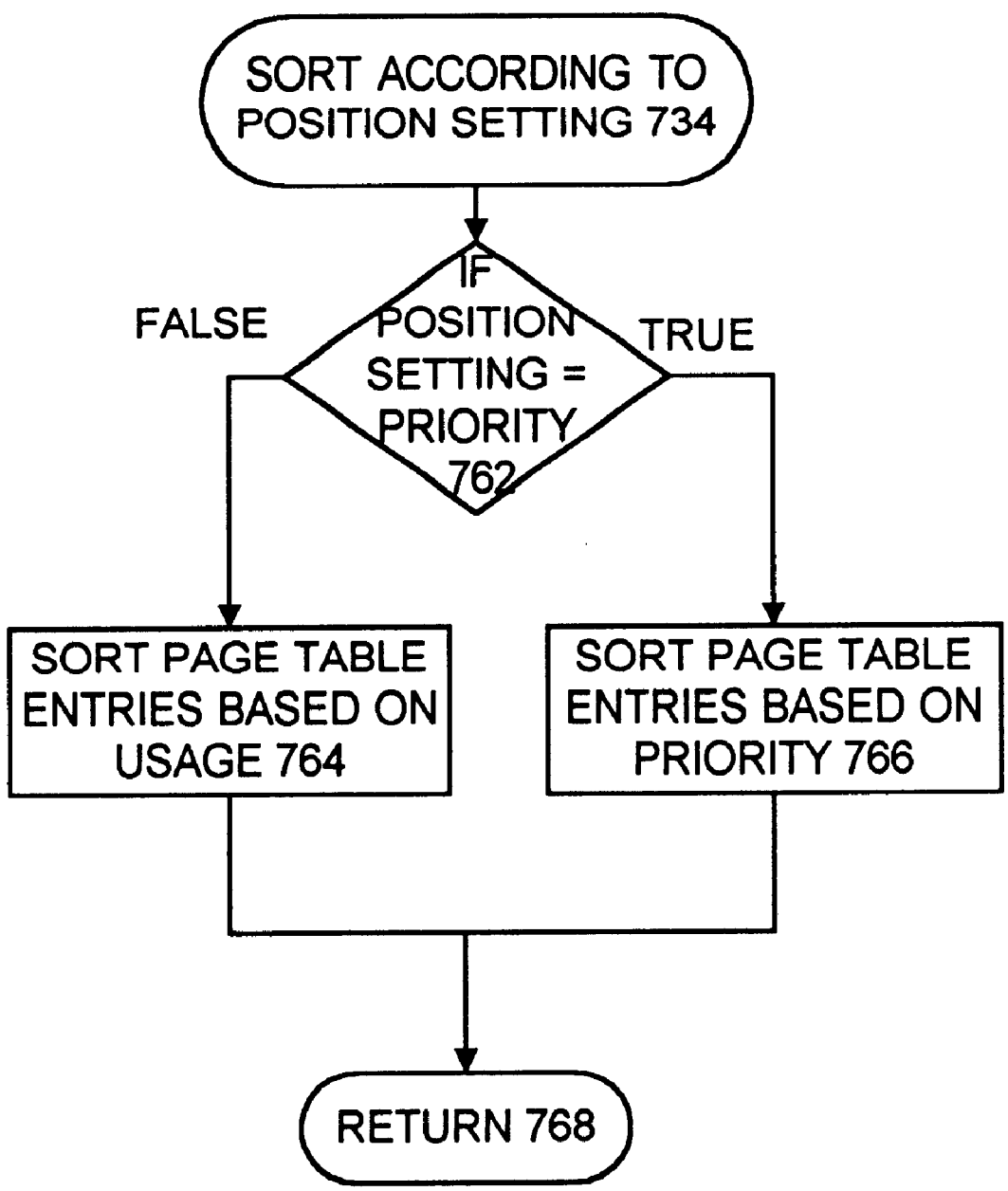

In FIG. 7C, the sequential steps to sort according position setting at block 734 of FIG. 7B are shown. Checking for a position setting of priority is performed as indicated at decision block 762. When the position setting is not priority, the page table entries are sorted based on usage as indicated at block 764. With a position setting of priority, the page table entries are sorted based on priority as indicated at block 766. Then the sequential operations return as indicated at block 768.

Figure 7D:
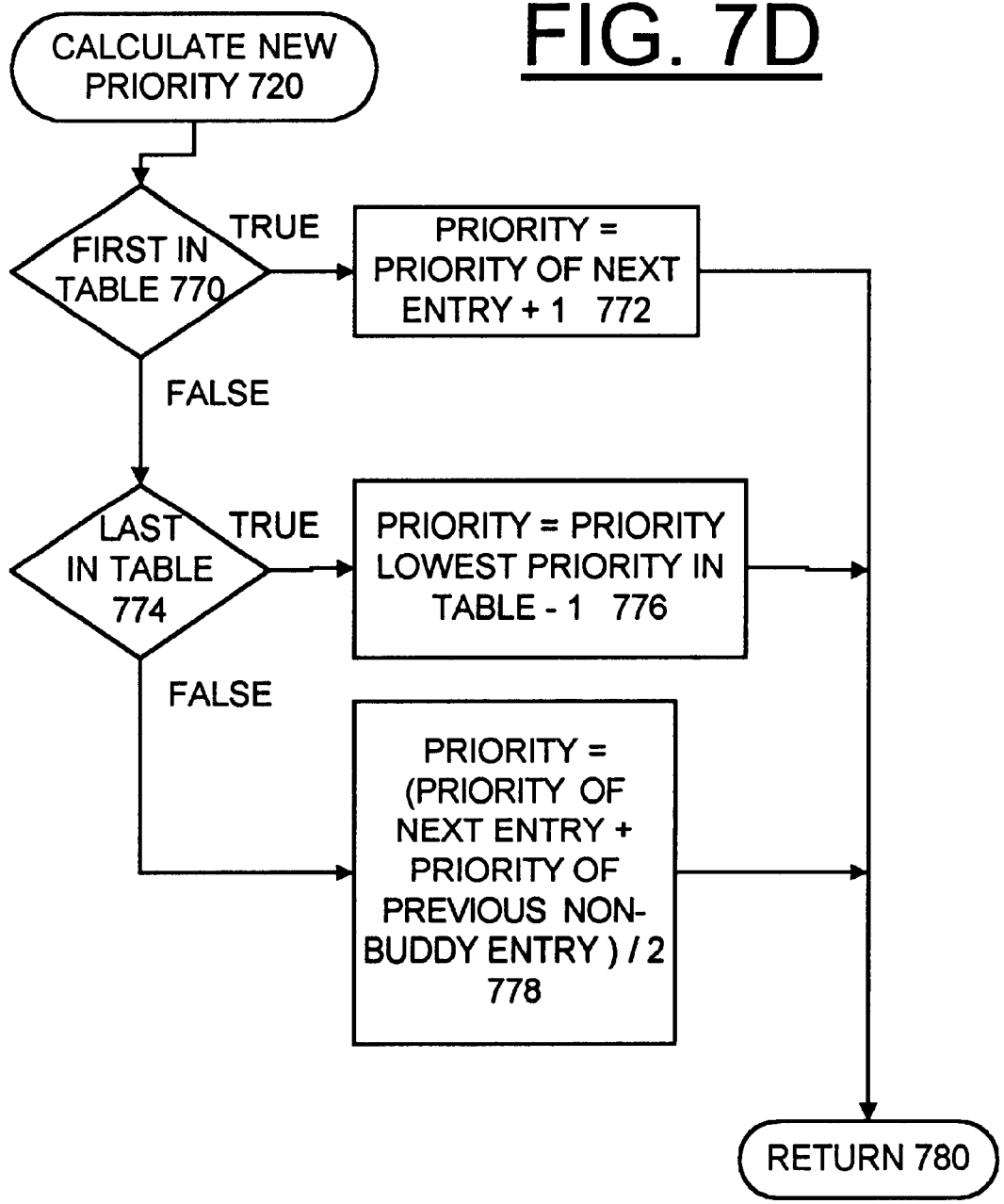

In FIG. 7D, the sequential steps to calculate a new priority at block 720 of FIG. 7B are shown. Checking for first in table is performed as indicated at decision block 770. If true, then the priority is set equal to the priority of next entry plus one as indicated at block 772. If not first in table, then checking for last in table is performed as indicated at decision block 774. If true, then the priority is set equal to the priority of the lowest priority in table minus one as indicated at block 776. In not last in table, then the priority is set equal to the sum of the priority of the next entry and the priority of previous non-buddy entry divided by two as indicated at block 778. Then the sequential operations return as indicated at block 780.

Figure 8:
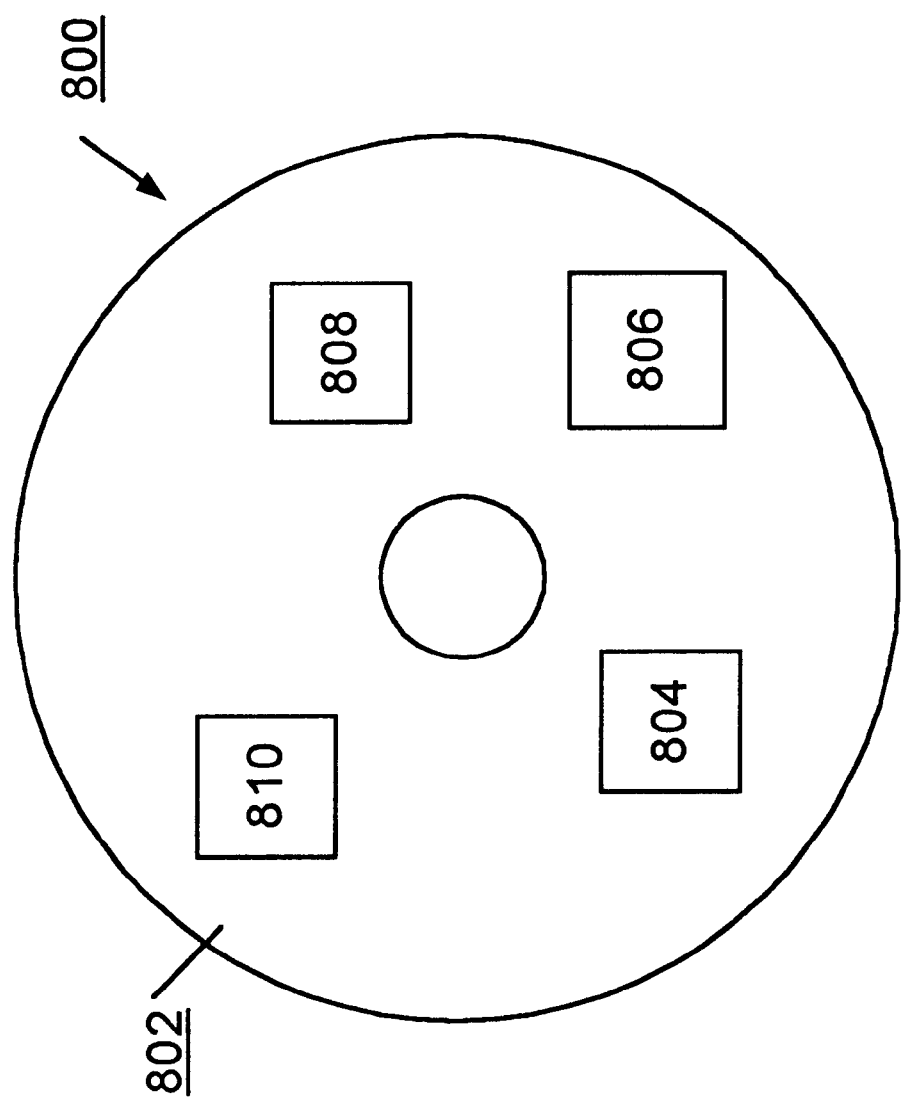
FIG. 8 is a block diagram illustrating a computer program product in accordance with the preferred embodiments.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the graphical user interface (GUI) organization control methods for extending GUI applications of the preferred embodiment in the system 100 of FIG. 1.

A sequence of program instructions or a logical assembly of one or more interrelated modules defined by the recorded program means 804, 806, 808, 810, direct the computer system 100 for providing graphical user interface (GUI) organization control for extending GUI applications of the preferred embodiments.

While the present invention has been described with reference to the details of the embodiments of the invention shown in the drawing, these details are not intended to limit the scope of the invention as claimed in the appended claims.

What is claimed is:

1. A computer implemented method for graphical user interface (GUI) organization control for extending GUI applications comprising the steps of:

processing a tabbed dialog; obtaining a stored page pocket list for said tabbed dialog; said tabbed dialog being a container for multiple property pages;

identifying each property page to be added to said tabbed dialog;

identifying a location within said tabbed dialog for each said identified added property page to said tabbed dialog so that each said added property page is inserted at any location within said tabbed dialog; each said location including a defined open page pocket;

displaying a modified tabbed dialog including each said added property page at said identified location within said tabbed dialog.

2. The computer implemented method for graphical user interface (GUI) organization control for extending GUI applications as recited in claim 1 wherein the step of identifying a location within said tabbed dialog for each said identified added property page to said tabbed dialog so that each said added property page is inserted at any location within said tabbed dialog includes the step of sorting tabbed dialog entries according to a position setting.

3. The computer implemented method for graphical user interface (GUI) organization control for extending GUI applications as recited in claim 2 wherein the step of sorting tabbed dialog entries according to said position setting includes the steps of identifying a priority value and utilizing said priority value for identifying a location within said tabbed dialog for each said identified added property page to said tabbed dialog.

4. The computer implemented method for graphical user interface (GUI) organization control for extending GUI applications as recited in claim 2 wherein the step of sorting tabbed dialog entries according to said position setting includes the steps of identifying a usage value and utilizing said usage value for identifying a location within said tabbed dialog for each said identified added property page to said tabbed dialog.

5. The computer implemented method for graphical user interface (GUI) organization control for extending GUI applications as recited in claim 1 wherein the step of identifying a location within said tabbed dialog for each said identified added property page to said tabbed dialog so that each said added property page is inserted at any location within said tabbed dialog includes the steps of identifying a drag and drop routine, identifying a drop position and utilizing said drop position for calculating a priority for said identified added property page.

6. The computer implemented method for graphical user interface (GUI) organization control for extending GUI applications as recited in claim 1 further includes the steps of;

for each entry in said page pocket list,
checking whether said page pocket list entry is a property page,
responsive to each said page pocket list entry being an identified property page, adding said identified property page to the tabbed dialog and wherein the steps of identifying each property page to be added to said tabbed dialog and identifying said location within said tabbed dialog for each said identified added property page to said tabbed dialog include the steps of
responsive to each said page pocket list entry being an identified page pocket, for each entry in a page registry, checking whether each said page registry entry matches said tabbed dialog and said identified pocket; and
responsive to each said page registry entry matching said tabbed dialog and said identified page pocket, adding said identified page registry entry page to the tabbed dialog.

7. The computer implemented method for graphical user interface (GUI) organization control for extending GUI applications as recited in claim 1 wherein the step of identifying each property page to be added to said tabbed dialog includes the step of checking for a buddy page for each said identified property page to be added to said tabbed dialog.

8. The computer implemented method for graphical user interface (GUI) organization control for extending GUI applications as recited in claim 1 further includes the step of maintaining a page table, said page table storing a loaded value used for identifying each property page to be added to said tabbed dialog.

9. The computer implemented method for graphical user interface (GUI) organization control for extending GUI applications as recited in claim 1 further includes the step of storing a page info record, said page info record including a tabbed dialog ID and a loaded value used for identifying each property page to be added to said tabbed dialog.

10. A computer program product for graphical user interface (GUI) organization control for extending GUI applications, said computer program product including a plurality of computer executable instructions stored on a computer readable medium, wherein said instructions, when executed by said server computer system, cause the server computer system to perform the steps of:

processing a tabbed dialog; obtaining a stored page pocket list for said tabbed dialog; said tabbed dialog being a container for multiple property pages;

identifying each property page to be added to said tabbed dialog;

identifying a location within said tabbed dialog for each said identified added property page to said tabbed dialog so that each said added property page is inserted at any location within said tabbed dialog; each said location including a defined open page pocket;

displaying a modified tabbed dialog including each said added property page at said identified location within said tabbed dialog.

11. The computer program product for graphical user interface (GUI) organization control for extending GUI applications as recited in claim 10 wherein the step of identifying a location within said tabbed dialog for each said identified added property page to said tabbed dialog so that each said added property page is inserted at any location within said tabbed dialog includes the step of sorting tabbed dialog entries according to a position setting, said position setting being based on one of a priority value and a usage value.

12. The computer program product for graphical user interface (GUI) organization control for extending GUI applications as recited in claim 10 wherein the step of identifying a location within said tabbed dialog for each said identified added page to said tabbed dialog so that each said added property page is inserted at any location within said tabbed dialog includes the step of identifying a drag and drop routine, identifying a drop position and utilizing said drop position for calculating a priority for said identified added property page.

* * * * *